Patented June 4, 1929.

1,715,945

UNITED STATES PATENT OFFICE.

AAGE WILLAND OWE, OF OSLO, NORWAY.

PROCESS OF PRODUCING VITAMINE PREPARATIONS.

No Drawing. Application filed March 11, 1926, Serial No. 94,033, and in Norway October 11, 1924.

I have filed applications in Norway Oct. 11, 1924, Ser. No. 31,586, and in Germany Nov. 3, 1924, Ser. No. 14561.

This invention relates to the production of vitamine preparations by saponifying vitamine bearing marine fats and subsequently extracting the reaction mass with edible fat and the most important characteristic feature of the invention consists therein that the extraction with edible fat takes place in the absence of water or in the presence of such small proportions of water that the soaps will not be appreciably hydrolyzed.

In the hitherto known methods of extracting soaps rich in vitamines with edible fats the soaps are in aqueous solution. As a consequence of this the reaction operation involves the formation of a very persistent emulsion which renders it difficult to separate the fat extract without taking up considerable proportions of soap.

As compared with these known processes the present invention is characterized therein that the extraction takes place under such conditions as to avoid appreciable hydrolyzation of the soaps. This involves the advantage, that after the extraction operation the oil can be separated in an entirely clear condition so that it can be used directly or after a quite simple purification treatment as component of medicine or food. In order to obtain that the soaps are in an undissociated condition during the extraction operation one may for example take care that the saponification is effected by means of a saponification agent (alkali or alkaline earth) which is free from or substantially free from water. The fats may for example be converted into lime soaps by saponifying with calcium hydroxide. When this saponification treatment is carried into effect in a suitable manner a solid mass results which can be readily pulverized and from which the vitamines in a greater or less proportion can be transferred by extraction into an edible fat which is liquid at the extraction temperature. It is of importance in order to obtain a satisfactory result in this extraction operation that oxygen and light is excluded during the operation because the vitamines would otherwise readily become destroyed.

*Example.*

1,4 kg. of caustic lime is slaked with water somewhat in excess of the theoretical quantity (for example about 1 liter).

10 kg. of fish liver oil is heated in an inert gas atmosphere to 80–100° C. whereupon the slaked lime is introduced in small portions and mixed with the oil by stirring.

The resulting mass is left standing for 18 to 20 hours in a vessel which is properly insulated against losses of heat.

After this time has lapsed the reaction is completed. The resulting solid calcium soap is ground to a powder, which is thereupon digested with 20 kg. of cotton oil at 40–50° C. during 20–24 hours. After cooling the oil is separated from the remaining solid residue by filtration. The resulting oil is clear and contains a great proportion of the vitamines of the initial material.

I claim:

1. The process of producing vitamine preparations which comprises saponifying a vitamine containing fat with an alkaline earth metal hydroxide to form a water insoluble metal soap, pulverizing the soap, and extracting the vitamines from the pulverized soap with an edible fat to form an edible fat containing vitamines.

2. The process as in claim 1 in which the alkaline earth metal hydroxide is slaked lime.

3. The process of producing vitamine preparations which comprises saponifying a vitamine containing fat with an alkaline earth metal hydroxide to form a water insoluble metal soap, lixiviating the resulting solid soap product with an edible fat and thereafter separating the resulting vitaminized edible fat from the remaining solid soap product.

4. Process according to claim 3 in which the alkaline metal hydroxide is slaked lime.

In testimony whereof I have signed my name to this specification.

AAGE WILLAND OWE.